(12) United States Patent
Savage et al.

(10) Patent No.: US 6,196,118 B1
(45) Date of Patent: Mar. 6, 2001

(54) EFFICIENT FRYING APPARATUS

(75) Inventors: Steven J. Savage, Concord; David W Tucci, Northfield; Anthony F. Reale, Center Barnstead, all of NH (US)

(73) Assignee: Pitco Frialator, Inc., Concord, NH (US)

( * ) Notice: Subject to any disclaimer, the term of this patent is extended or adjusted under 35 U.S.C. 154(b) by 0 days.

(21) Appl. No.: 09/390,284

(22) Filed: Sep. 3, 1999

(51) Int. Cl.[7] .............................. A47J 37/00; A47J 37/12
(52) U.S. Cl. .............................. 99/403; 99/330; 126/375; 126/391
(58) Field of Search .............................. 99/325–334, 337, 99/338, 403–410; 126/375, 378, 92 R, 92 AC, 390–392, 357, 360 R; 210/167, DIG. 8; 165/109.1; 219/492, 494, 497, 510, 512; 426/231, 233, 438, 519

(56) References Cited

U.S. PATENT DOCUMENTS

| | | | |
|---|---|---|---|
| 4,228,730 | * | 10/1980 | Schindler et al. ........................ 99/407 |
| 4,372,980 | * | 2/1983 | Luebke et al. ........................ 426/231 |
| 4,639,213 | * | 1/1987 | Simpson ........................ 431/326 |
| 4,660,542 | * | 4/1987 | Scherer ........................ 99/403 |
| 4,684,412 | * | 8/1987 | Fritzsche ........................ 99/330 X |
| 4,848,318 | * | 7/1989 | Brewer ........................ 126/390 |
| 4,913,041 | * | 4/1990 | Taber et al. ........................ 126/391 |
| 4,923,705 | * | 5/1990 | Mottur et al. ........................ 426/438 X |
| 5,185,168 | * | 2/1993 | Takahashi ........................ 426/233 |
| 5,209,218 | * | 5/1993 | Daneshvar et al. ........................ 99/403 X |
| 5,417,202 | * | 5/1995 | Cote ........................ 99/403 X |
| 5,490,449 | * | 2/1996 | Meister et al. ........................ 99/403 |
| 5,706,717 | * | 1/1998 | Barner ........................ 99/330 |

\* cited by examiner

*Primary Examiner*—Timothy Simone
(74) *Attorney, Agent, or Firm*—Donald C. Casey, Esq.

(57) ABSTRACT

A baffle system for a deep fat fryer is described. The baffle system improves heat transfer from straight heat tubes which pass through the tank. The baffle is disposed within the tube to encounter products of combustion from a gas fired burner which enter the tube, and causes the products of combustion to swirl against the internal walls of the heat tube. In addition the baffle provides radiant surfaces which, when heated, radiate heat energy against the walls of the tube and the baffle rests on the tube wall itself to heat the same by conduction. Each baffle includes a plate with wings struck therefrom disposed at an acute angle against the flow of combustion products and each wing terminates in a flat tab disposed parallel to the plate for radiant energy.

15 Claims, 3 Drawing Sheets

EFFICIENT FRYING APPARATUS

CROSS REFERENCE TO RELATED APPLICATIONS

This application is related to pending U.S. application Ser. No. 08/724,233, filed Sep. 27, 1996 and assigned to the assignee of this invention.

FIELD OF THE INVENTION

This invention relates to deep fat fryers and in particular to deep fat fryers in which the oil used for cooking is efficiently heated with a gas burner.

DESCRIPTION OF THE PRIOR ART

Commercial deep fat fryers have been in use for many years and conventional fryers generally include a tank heated by one or more heat tubes which extend through the tank. A gas burner may be used to heat the tube or tubes so that the heat can be transferred into the surrounding oil and then exhausted through a flue. The efficiency of the heat transfer, then, from the gas burner to the oil is important. In a fast food cooking operation, where large quantities of food are cooked on a continuous basis, improving the efficiency of the heat transfer can translate into significant cost savings.

Typically, an in-shot burner directs combustion gases into one end of the fryer heat tube. Various configurations of tubes are known in the prior art, such as U-shaped or S-shaped which are intended to maximize the dwell time of combustion gases in the tube and therefore the heat transfer from the combustion gases into the surrounding oil.

In order to facilitate heat transfer it is desirable to heat the entire tube with combustion gases. In the absence of an internal baffle system to distribute the combustion gases around the interior of the pipe the upper portion of the tube will be hotter than the lower portion. It is known in the prior art to use a U-shaped heat tube with an internal baffle system to attempt to heat the tube more uniformly. A baffle arrangement is intended to produce a swirling effect on the combustion gases as they pass through the tube and around bends in the tube to increase the dwell time within the tube. In this way more heat can be extracted from the gas before it is exhausted into the flu without scorching the tube at bends.

Typically a straight heat tube is not used because of the shorter dwell time for the combustion gases passing through the tube from a burner at one end to a flue at an opposite end. However, a U-shaped or S-shaped tube with increased dwell time also presents maintenance and corrosion problems at the bend of the tube. Accordingly, there is a need for an efficient means for heating oil in a deep fat fryer using a gas fired heat tube.

SUMMARY OF THE INVENTION

It has been discovered that a unique baffle design, in a straight heat tube, can be used in a fat fryer to efficiently heat oil. By using the baffle of this invention sufficient heat can be extracted from the products of combustion that an in-shot burner in a straight heat tube can be used efficiently. This, then, avoids maintenance problems associated with U-shaped or S-shaped tubes.

The baffle design of this invention is a stamped plate of steel so and can be fabricated entirely without welding. In addition the baffle design facilitates the generation of radiant energy to assist in heat transfer. Therefore, the internal surface of the heat tube is heated both by convection currents of hot combustion gases and by radiant energy of the baffle itself. The baffle plate has wings struck therefrom which terminate in a flat plate which extends parallel to the internal surface of the heat tube wall. By providing a plurality of these wings mutually spaced along the baffle length the baffle can be made of thinner material, so that it can heat up can heat up and cool down quickly.

The baffle is a rectangular plate extending longitudinally along the longitudinal axis of the tube. Wings are disposed in vertical columns and longitudinal, horizontal rows.

The baffle wings are staggered vertically so that each vertical column has one wing extending in from one baffle face and two extending from the opposite face. Spacer tabs are also provided, extending from opposite faces to assist in mounting the baffle in a heat tube. The wings and tabs alternatively extend from the faces of the baffle as will be subsequently explained.

The heat tube structure mounts a burner at one end and the baffle system of this invention extends along the length of the tube. The baffle plate is spaced away from the burner so that products of combustion enter the tube before impacting on the baffle.

The alternate baffle wings produce the desired mixing effect so that maximum heat release of the fuel gas is achieved. The tube is heated uniformly to maximize efficiency.

Accordingly, it is an object of this invention to provide a heat tube assembly for a deep fat fryer which is cylindrical and contains a baffle plate for efficient heat transfer for the products of combustion from the burner to the wall of the heat tube.

It is another object of this invention to provide an alloy baffle plate having opposed wings which terminate in flat flanges disposed parallel to the interior surface of a heat tube for providing radiant energy to heat the tube wall.

It is still another object of this invention to provide a deep fat fryer assembly having a plurality of heat tubes extending horizontally therethrough with each tube containing a baffle plate to assist in heat transfer from the tube burner to the tube walls.

It is yet another object of this invention to provide a steel baffle plates which contains no welded members and can be stamped with wing members alternatingly struck therefrom and spacer tabs also struck therefrom for mounting within the heat tube.

These and other objects will become readily apparent with reference to the drawings and following brief description of the drawings wherein:

DETAILED DESCRIPTION OF THE INVENTION

Figure 1:
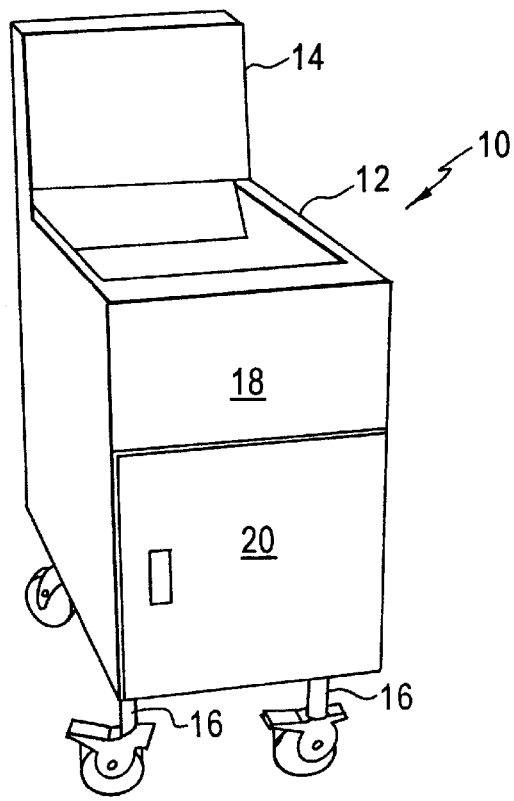
FIG. 1 is a perspective front view of an embodiment of the deep fat fryer of this invention.

With attention to the drawings and FIGS. 1–4 in particular, a deep fat fryer of this invention 10 a tank 12, a rear flue 14 and may be mounted on wheels 16. The front 18 has an access door 20 for access to the burner pilot and the like (not shown). A filter system (not shown) also would be provided with access through the door 20 available.

Figure 2:
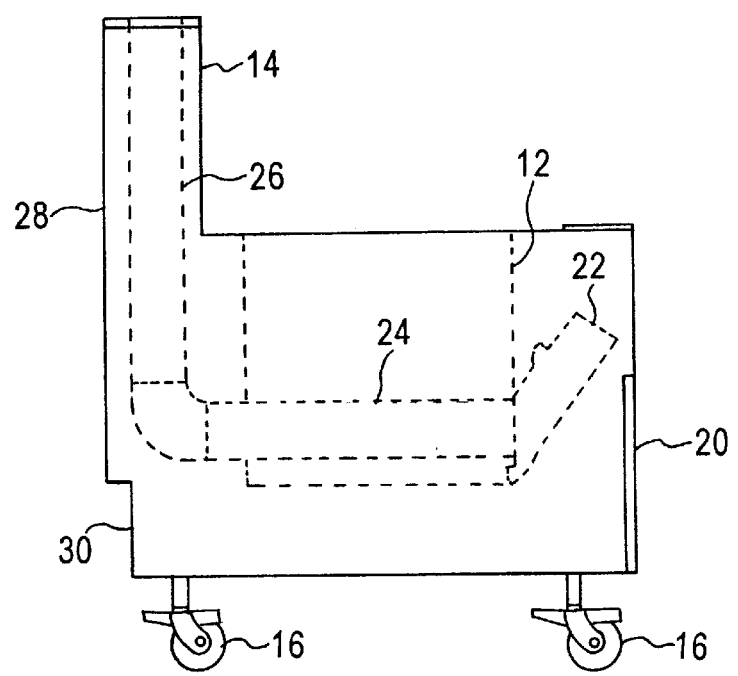
FIG. 2 is a side view of the deep fat fryer of FIG. 1.
Figure 3:
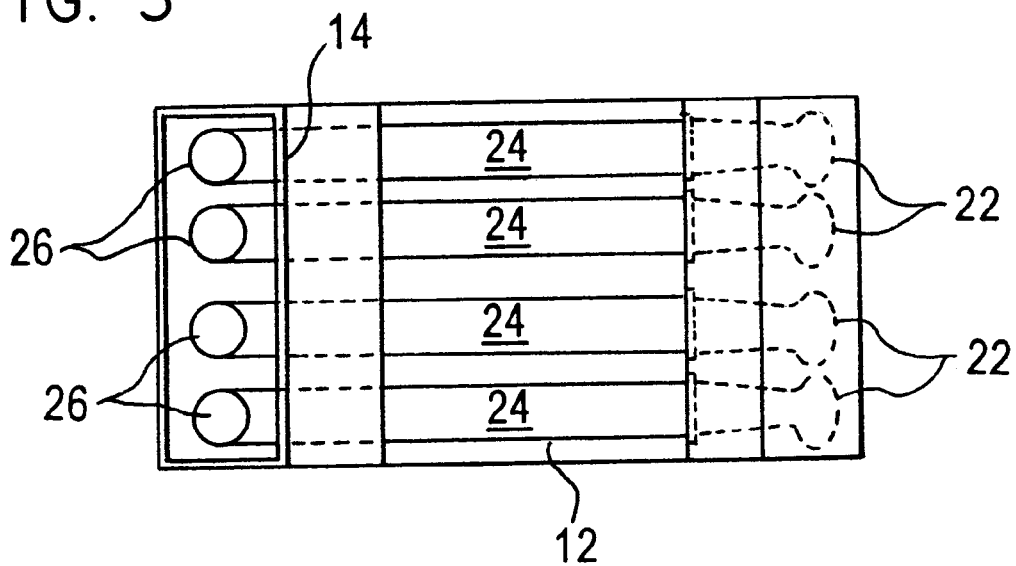
FIG. 3 is a top view of one embodiment of this invention showing four heat tubes.
Figure 4:
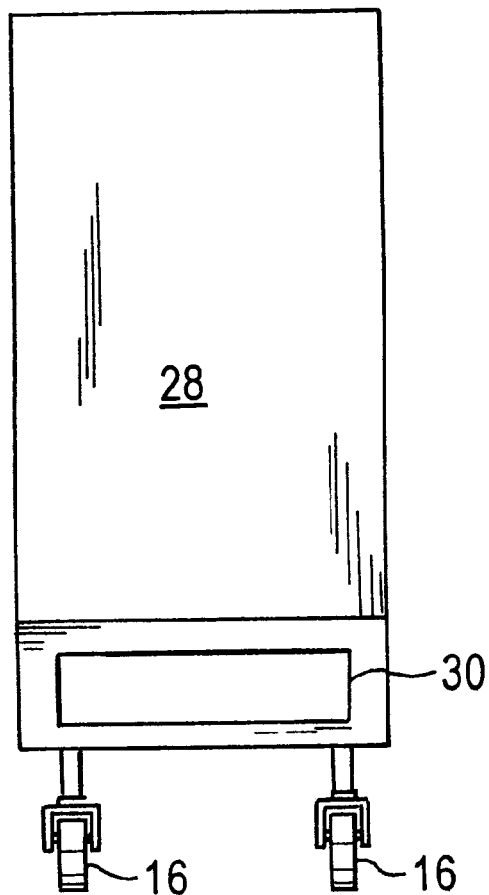
FIG. 4 is a rear view of a deep fat fryer of this invention.
Figure 5:
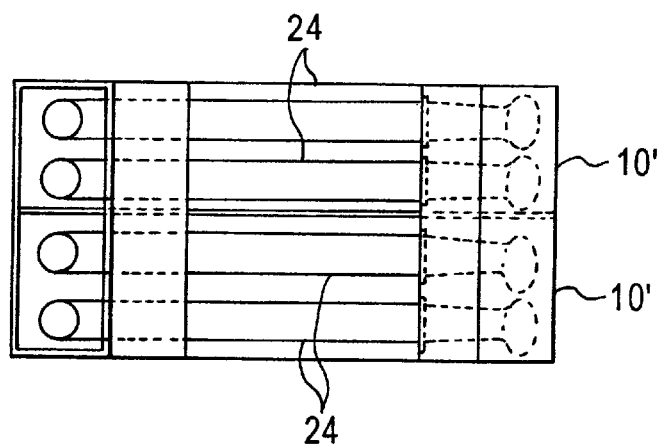
FIG. 5 is a top view of an alternative embodiment showing twin vat fryers each having two heat tubes.

In the embodiment of FIG. 2 there is shown schematically a burner 22 and a heat tube 24 extending through the tank 12 to a flue pipe 26 in flue 14. The source of gas for the burner 22 is not shown. Burner 22 then sends a jet of products of combustion through the heat tube 24 and the oil (not shown) disposed in tank 12 will be heated by conductive heat transfer from the walls of the tube 24. The products of combustion then exit tube 24 into the flue pipe 26 for exhaustion. As shown in FIG. 4, the rear 28 of the fryer 10 defines an opening 30 which is a source of air for the burner 22. In the embodiment of FIG. 3 four heat tubes 24 are shown extending through a single tank 12. Each tube 24 has a separate burner 22. In the embodiment of FIG. 5 twin deep fat fryers 10 are shown, each with two burner tubes 24. As will be obvious to those skilled in the art, typically 2, 4, or even 5, burner tubes may be provided. The kitchen space requirements will dictate, at least in part, the size of the tank and deep fat fryer used. In some situations a single unit with two burner tubes would be sufficient whereas if more space is available and a higher volume of food to be cooked needed, it may be necessary to go to a larger tank with four or five heat tubes. In each instance each tube would have its own burner.

In the preferred embodiment of this invention a burner disposed at an angle to the longitudinal axis of the heat tube is provided. In some instances a convention in-shot burner may be used wherein the burner axis coincides with the longitudinal axis of the heat tube or, if space is available a 90 degree burner may be used wherein the burner jet makes a 90 degree turn to align with the longitudinal axis of the heat tube. The burner then could be mounted at an acute angle to the longitudinal axis of the heat tube, coaxially with the longitudinal axis, or at a 90 degree angle thereto.

Figure 6A:
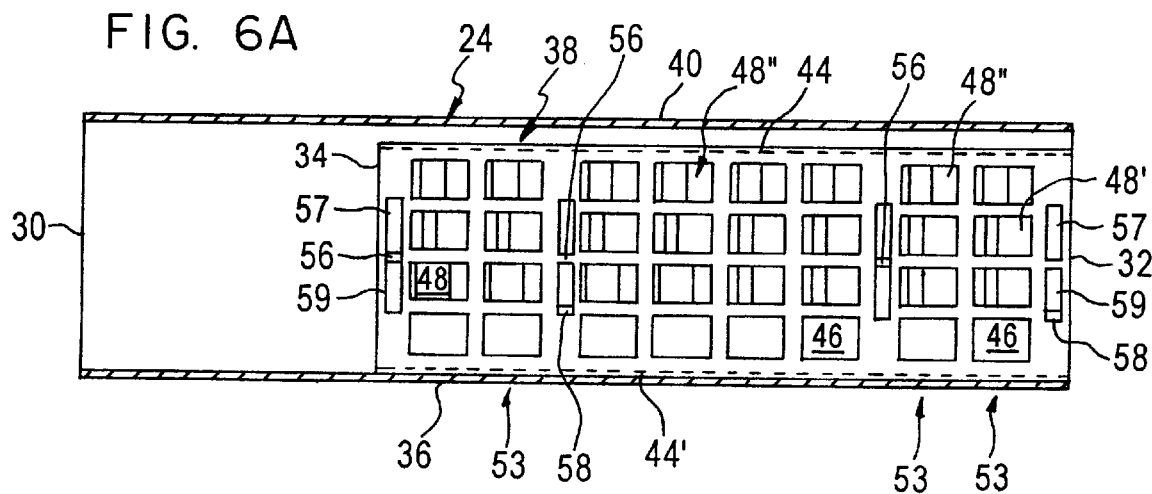
FIG. 6A is a side view of a heat tube containing the baffle plate of this invention.
Figure 6B:
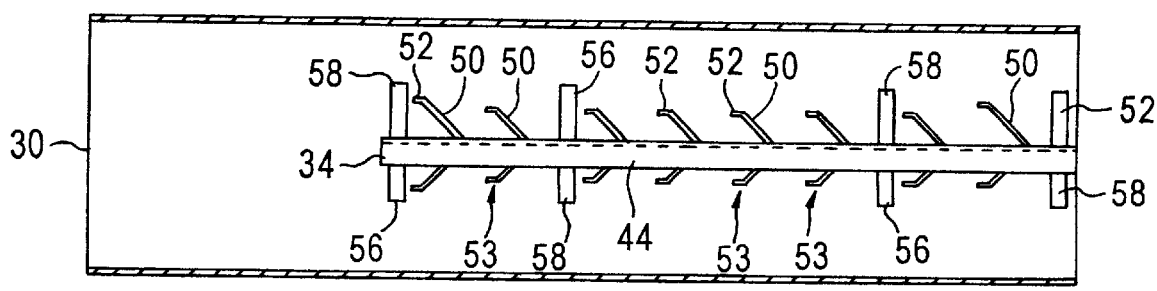
FIG. 6B is a top view of the heat tube of FIG. 6A.

The novel baffle of this invention is shown in FIG. 6A and 6B. In this instance the heat tube 24 has a burner entrance end 30 and flue outlet end 32. The heat tube 24 is conventionally constructed and is oval in cross sectional configuration. Typically the rectangular baffle plate 34 of this invention will rest on the lower surface 36 of burner tube 24 and a space 38 will be provided above the baffle plate 34 between the upper surface of the plate 34 and the upper surface 40 of the tube 24. Dimensionally, the height of the tube from surface 36 to surface 40 may be four inches or in larger units up to six inches. The dimensions, however, are intended to provide about one-half inch for space 38. The plate 34 extends over two-thirds of the distance along the longitudinal axis of the tube 24. The space permitted for the burner jet through opening 30 before impacting plate 34 is about four to six inches.

The unique baffle system of this invention includes flanges 44 and 44' which extend perpendicular to plate 34 along the upper and lower surfaces. A row of rectangular opening 46 extends the length of the plate 34 along the bottom surface and three rows 48, 48', and 48" are mutually spaced above the bottom row 46. Each opening in rows 48, 48' and 48" defines a wing 50 struck from the plate 34 to form the opening and each wing has a flat tab 52 disposed parallel to the side of the tube 24.

As shown in FIG. 6B the wings 50 are alternately struck from the plate 34 so that two of such vertically disposed wings 50 extend from one side and a middle wing extends from the opposite side of each vertical column 53. The wing extensions then alternate along the plate 34.

For example, in a vertical column 53 when a wing 50 extends from row 48', wings 50 in rows 48" and row 48 extend from the opposite side of the plate 34. Furthermore, when a wing extends from one side of row 48' in a vertical column 53, in the next adjacent vertical column 53 it will extend from the opposite side of the plate 34. Therefore wings 50 in row 48 extends from alternate sides of plate 34 and wings 50 in rows 48' and 48" also extend from alternate sides in adjacent files along the length of plate 34. But wing 50 in rows 48 and 48" extends from the same side of plate 34 in each column while wings 50 in row 48', in each column, extend from the opposite side.

In addition, spacer tabs 56 and 58 are struck from plate 34 and also alternate between sides of plates 34. This leaves openings 57 and 59 in plate 34. For example, tab 58 extends from the bottom portion of plate 34 adjacent the row of openings 46 from alternate sides and tabs 56 extends also from alternative sides but is located between rows 48 and 48'.

Spacer tabs 56 and 58 and wings 50 are all struck from the stainless steel plate 34 so that no welding is required to form the baffle plate of this invention.

The products of combustion then enter tube 24 at opening 30 and encounter the leading edge of plate 34. In the absence of a baffle plate or other obstruction the products of combustion by buoyancy would be attracted to the upper portion 40 of tube 24 and would pass through the tube and exit at the flue opening 32. However, the baffle plate 34 of this invention causes the products of combustion to swirl through the openings 46, 48, 48' and 48" and 57 and 59 heating the plate 34 and the wings 50. The wings 50 and extensions 52 radiate heat directly against the opposing sides of the tube 24 to facilitate heat transfer from the products of combustion to the walls of the tube 24. This improved heat transfer is based on a combination of the wings and spacer tabs 50, 56, and 58 which provide the openings for the swirling passage of the products of combustion but also direct radiant energy towards the sides of the tube 24.

With further attention to FIG. 6A, the lower flange 44' rests on the inner wall of tube 24 and thereby conducts heat to the tube wall when plate 34 is heated.

The upper flange 44 is spaced away from the upper surface 40 of tube 24 by space 38. Therefore when the upper flange 44 is heated it radiates heat against the tube wall 40 in the same fashion as tabs 52.

When products of combustion from the burner enter the tube at opening 30, the impact the baffle plate 34 and wings 50 direct the products of combustion through the holes formed when each wing 50 is struck from plate 34. This causes the products of combustion to swirl within the tube 24.

As the products of combustion pass through and around the wings 50 and the spacer tabs 56 and 58, the plate 34 becomes heated. When plate 34 becomes heated it radiates heat from the tabs 52 and flange 34 against the walls of the tube 24 to heat the same by radiant energy.

Finally the flange 34' rests against the wall of tube 24 and therefore when that flange becomes heated it passes heat through the tube wall by conduction.

The baffle plate of this invention, then, transfers heat from the gaseous products of combustion passing through the tube to the tube walls by convection, conduction, and radiation. As a result, heat transfer in the tube with the baffle system of this invention is efficient and there is sufficient heat transfer so that a straight tube 24 can heat oil sufficiently so that a U-shaped or S-shaped tube will not be necessary.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

What is claimed is:

1. A heat tube baffle for a deep fat fryer wherein the fryer includes an oil tank for cooking food with at least one heat tube extending therethrough in heat exchange relationship with said tank wherein cooking oil in said tank is heated by said tube and wherein a burner generates products of combustion which flow through said tube from an entrance to an exit, said baffle comprising:

an elongated, rectangular metal plate having opposed faces, said plate disposed within said tube and extending within said tube abutting the exit thereof, said plate having a plurality of mutually spaced wings struck therefrom in mutually spaced rows and extending at an acute angle to said plate along the length thereof each wing in each row extending outwardly toward the adjacent tube wall and directed upstream of said flow, each struck wing leaving a corresponding hole in said plate whereby products of combustion in said flow are directed through the hole by said wing.

2. The baffle of claim 1 wherein said heat tube is a cylinder and each plate is disposed extending along the longitudinal axis thereof.

3. The baffle plate of claim 2 wherein each wing terminates in a flat tab contained in a plane disposed parallel to the plane containing said plate.

4. The baffle plate of claim 3 wherein said plate has an upper and a lower edge extending parallel to the longitudinal axis of said tube and each defines a flange extending perpendicular to said plate.

5. The baffle of claim 4 wherein a row of openings is provided in said plate adjacent said lower edge thereof.

6. The baffle plate of claim 5 wherein three rows of said wings are provided.

7. The baffle plate of claim 6 wherein each wing in each row is disposed in a vertically aligned column.

8. The baffle plate of claim 7 wherein a column of wings has upper, lower and middle wings with the middle wing extending from one face of said plate and the upper and lower wings extending from an opposite face of said plate.

9. The baffle plate of claim 8 wherein adjacent wings in each row extend from opposite faces of said plate.

10. The baffle plate of claim 9 further comprising a plurality of mutually spaced spacer tabs struck therefrom and extending perpendicular to the opposed faces of said plate.

11. The baffle plate of claim 10 wherein said spacer tabs are disposed in mutually spaced vertical columns.

12. The baffle plate of claim 11 wherein said spacer tabs are contained in rows extending parallel to the longitudinal axis of said tube with adjacent spacer tabs in each row extending from an opposite face of said plate.

13. In a gas fired, tube heated deep-fat fryer wherein a plurality of substantially straight heat tubes having an inner and an outer wall extend through an oil tank to heat said tank, the improvement comprising:

baffle plate means disposed in each tube for causing the products of combustion passing therethrough to transfer heat to said tube by convention, radiation and conduction wherein said plate means causes said products of combustion to swirl against the inner wall of said tubes and said means further comprise tabs for radiating heat energy against said tube inner walls and a first heat conducting flange abutting a portion of the inner wall of said tube.

14. The fryer of claim 13 wherein said baffle means comprises a metal plate having said tabs struck therefrom.

15. The fryer of claim 14 wherein said plate contains a second heat conducting flange extending the length thereof for radiating heat energy against said tube inner walls.

* * * * *